Patented July 28, 1936

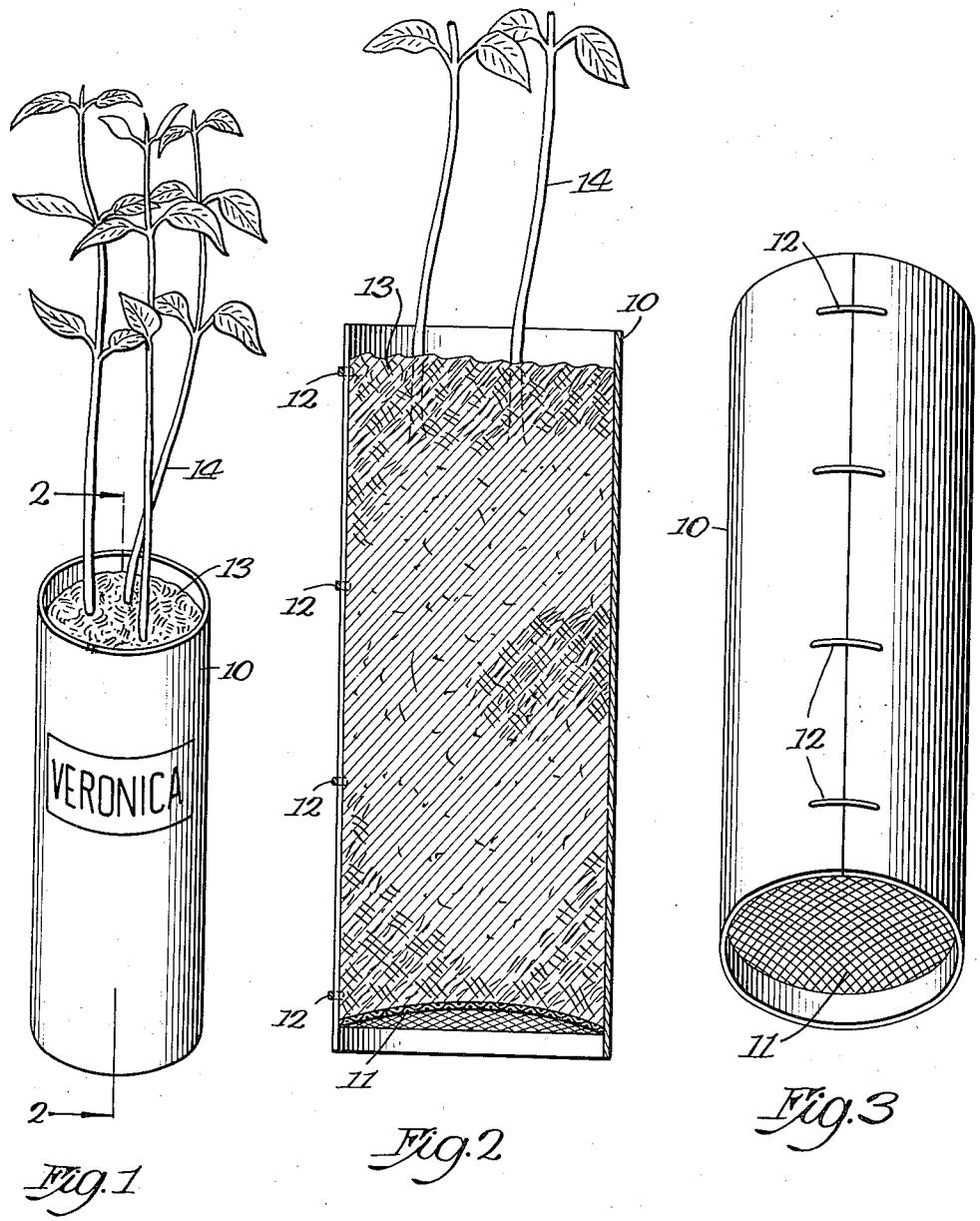

2,048,873

UNITED STATES PATENT OFFICE 2,048,873

PLANT PACKAGE

Ernest Kruse, Wheeling, Ill.

Application July 3, 1935, Serial No. 29,619

2 Claims. (Cl. 206—46)

The invention relates to plant packages especially intended for use in merchandising.

The usual practice in the merchandising of plants is to wrap their roots in paper or fabric, and has many disadvantages. Such packages are not convenient for display and require quick sales, as the plants quickly dry out and cannot be conveniently remoistened.

Because of the latter disadvantage it is the customary practice of merchants to receive nursery stock on consignment, as it quickly becomes unsalable.

To a limited extent small plants are sold in earthen pots, but this method has the disadvantage that the pots are not convenient for the display of the stock, and, while the plants may be moistened, considerable labor and loss from breakage is involved.

The objects of the present invention are to provide a package which may be readily formed into shape by the nurseryman; is small and compact; conveniently and economically prepared for the market; can be packed with companions of life form in small space for shipment and display; will conserve the moisture about the plant roots; and may be conveniently remoistened, without endangering either the plant or the package, and renders the replanting operation simple, convenient and safe to the plant.

Because of these advantages the nurseryman can dispose of his stock by sale and the merchant will have no difficulty in preserving it, should the selling be delayed.

The invention consists in a package or carton formed preferably of a thin sheet of wood bent into the form of a cylinder, and having its meeting edges secured together, as by staples; a closure for one end of the tube thus formed which will permit the entry of moisture; and a filling for the tube of soil within which the roots of a plant are embedded.

In the accompanying drawing

Fig. 1 is a perspective of the completed package;

Fig. 2 is a longitudinal section on the line 2—2 of Fig. 1; and

Fig. 3 is a view in perspective of the carton.

Though the package may be changed as to details, within the scope of the invention, a preferred construction is shown and described.

The carton 10 is in the form of a cylinder open at one end and closed at the other, as shown at 11, by a porous material; and I have found that a reticulated fabric is quite suitable for this purpose.

The cylindrical portion of the carton is preferably formed of a sheet of wood, or other fibrous material having a grain. This sheet is molded to cylindrical form by bringing together the two of its edges which are parallel with the grain. Preferably the dimensions of the sheet are such that when these edges abut, as shown in Fig. 3, the carton is of suitable diameter. The meeting edges of the sheet are now secured together by any suitable means, preferably by wire staples, as indicated at 12. The closure 11 may be secured in position by any suitable means. When it is formed of a material such as a metal reticulated fabric, it is self-securing if having a diameter slightly in excess of the internal diameter of the tube, into which it is forced by bending pressure, giving it the dome form shown in Fig. 2,—the inherent elasticity of the material binding it in place.

The carton is now filled with soil, 13, within which the roots of the plant 14 are embedded.

The body of the carton is preferably rendered impervious to moisture by the application to its surface or surfaces of a suitable liquid, such as paraffin, with an admixture of resin, and this is conveniently accomplished by merely dipping the carton in the liquid.

The label may be applied to the cylindrical wall of the carton, and I have found it desirable to imprint it directly upon the sheet of which the cylinder is formed, while it is in flat form.

These cartons may be of any suitable size to accommodate the plants with which they are to be used. They may be conveniently and securely packed for shipping side by side in a suitable casing, and they may be displayed for sale in a similar casing or tray. When, for this latter purpose, a tray is used which will be water-tight, the stock is maintained in healthy condition by merely pouring a little water in the tray to bring it above the level of the closure 11 of the carton, and the soil within which the plant is embedded will draw up the moisture by capillary action. The water may, of course, be poured into the upper end of the carton.

Any suitable soil may be used. Desirably a soil of such a character is employed that replanting will not necessitate the disturbing of the roots.

The plant may be readily removed from the carton by splitting the latter lengthwise, and this operation is, of course, facilitated when the grain of the sheet, of which the body of the carton is formed, is lengthwise thereof. While obviously this removal operation is simplified by the use of a sheet of material having a grain, it could be facilitated where the cylinder is formed of a material not having this characteristic, by providing in the latter a weakened longitudinal zone.

I claim as my invention—

1. A carton for plants comprising a cylindrical body formed of a thin sheet of wood and maintained in such form by binders of material impervious to moisture, one end of the cylinder being closed by a foraminous metal sheet normally of greater diameter than the chamber of the body and forced into the cylinder by distorting pressure, whereby the closure is retained in place by its inherent expansibility.

2. A carton for plants comprising a cylindrical body formed of a thin sheet of wood and maintained in such form by binders of material impervious to moisture, one end of the cylinder being closed by a reticulated metal screen normally of greater diameter than the chamber of the body and forced into the cylinder by distorting pressure, whereby the closure is retained in place by its inherent expansibility.

ERNEST KRUSE.